(12) United States Patent
Munro (10) Patent No.: US 10,807,309 B2
(45) Date of Patent: Oct. 20, 2020

(54) LATCHING SYSTEM FOR THREE DIMENSIONAL PRINT ENGINE

(71) Applicant: 3D Systems, Inc., Rock Hill, SC (US)

(72) Inventor: Michael W. Munro, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 165 days.

(21) Appl. No.: 15/816,397

(22) Filed: Nov. 17, 2017

(65) Prior Publication Data

US 2019/0152144 A1 May 23, 2019

(51) Int. Cl.
| | |
|---|---|
| *B29C 64/259* | (2017.01) |
| *B29C 64/20* | (2017.01) |
| *B33Y 30/00* | (2015.01) |
| *F16B 2/10* | (2006.01) |
| *B29C 64/124* | (2017.01) |
| *B29C 64/135* | (2017.01) |

(52) U.S. Cl.
CPC ............ *B29C 64/259* (2017.08); *B29C 64/20* (2017.08); *B33Y 30/00* (2014.12); *F16B 2/10* (2013.01); *B29C 64/124* (2017.08); *B29C 64/135* (2017.08)

(58) Field of Classification Search
CPC ..... B29C 64/259; B29C 64/20; B29C 64/124; B29C 64/135; B33Y 30/00; F16B 2/10
USPC ........................................................ 425/182
See application file for complete search history.

(56) References Cited

U.S. PATENT DOCUMENTS

| | | | |
|---|---|---|---|
| 9,067,361 B2 | 6/2015 | El-Siblani | |
| 9,561,624 B1 | 2/2017 | Wu | |
| 9,636,873 B2 | 5/2017 | Joyce | |
| 2010/0038268 A1 | 2/2010 | Reynolds et al. | |
| 2011/0089610 A1* | 4/2011 | El-Siblani | B29C 33/44 264/401 |
| 2012/0248793 A1* | 10/2012 | Fiedler | A44B 11/258 292/163 |
| 2013/0182381 A1* | 7/2013 | Gray | F16M 13/02 361/679.01 |
| 2014/0085620 A1 | 3/2014 | Lobovsky et al. | |

(Continued)

FOREIGN PATENT DOCUMENTS

WO     2016013038     1/2016

OTHER PUBLICATIONS

PCT International Search Report the International Searching Authority for PCT/US2018/054068, dated Jan. 18, 2019 (6 pages).

(Continued)

*Primary Examiner* — Robert C Dye
*Assistant Examiner* — Guy F Mongelli (57) ABSTRACT

A three dimensional printing system includes a vertical support, a support plate, a resin vessel, and an interface mechanism. The support plate extends away from the vertical support along a first lateral axis from a proximal end to a distal end. The resin vessel is disposed above the support plate and includes a pair of latch features disposed at opposing ends of the resin vessel relative to a second lateral axis. The interface mechanism includes a pair of latches and a movable plate. The pair of latches are disposed adjacently to the opposed ends of the resin vessel. The movable plate is configured to engage the pair of latches with a single downward movement of the movable plate. In response to the engagement by the movable plate, the latches engage the latch features of the resin vessel.

17 Claims, 12 Drawing Sheets

(56) References Cited

U.S. PATENT DOCUMENTS

2014/0085621 A1\* 3/2014 Lee .................. G01S 7/481
                                                356/4.01
2016/0245457 A1\* 8/2016 Skull ..................... G06F 1/16
2017/0021562 A1   1/2017 El-Siblani et al.
2017/0320644 A1\* 11/2017 Leopold ............. B65D 43/0225

OTHER PUBLICATIONS

PCT Written Opinion of the International Searching Authority for PCT/US2018/054068, dated Jan. 18, 2019 (5 pages).

\* cited by examiner

LATCHING SYSTEM FOR THREE DIMENSIONAL PRINT ENGINE

FIELD OF THE INVENTION

The present disclosure concerns an apparatus and method for fabrication of solid three dimensional (3D) articles of manufacture from radiation curable (photocurable) resins. More particularly, the present invention improves reliability and accuracy of a system for mounting a resin vessel holding radiation curable resin.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin.

One challenge with stereolithography systems is the assembly and disassembly of various components of the system before and after use. It is important to very accurately control positioning and force of the various components to assure that an optical path in the system is consistent. Also, there is a need to be able to perform assembly and disassembly quickly and conveniently to maximize productivity of equipment and users.

SUMMARY

In a first aspect of the disclosure, a three dimensional printing system includes a vertical support, a support plate, a resin vessel, and an interface mechanism. The vertical support extends along a vertical axis. The support plate extends away from the vertical support along a first lateral axis from a proximal end to a distal end. The resin vessel is disposed above the support plate and includes a pair of latch features disposed at opposing ends of the resin vessel relative to a second lateral axis. The vertical axis, the first lateral axis, and the second lateral axis are mutually orthogonal. The interface mechanism includes a pair of latches and a movable plate. The pair of latches are disposed adjacently to the opposed ends of the resin vessel. The moveable plate includes a central opening to provide access to the resin vessel in a latched configuration. The movable plate is configured to engage the pair of latches with a single downward movement of the movable plate. In response to the engagement by the movable plate, the latches engage the latch features of the resin vessel.

In one implementation the latch features include upwardly facing surfaces, the pair of latches include hooks for exerting downward forces upon the latch features. The latch feature can also include surfaces of other orientations. The forces exerted by the hooks can include lateral forces to resist lateral motion.

In another implementation each latch is rotatably mounted to the support plate. Each latch extends inwardly from the rotational mount to an engagement end at which the latch engages the latch feature. The rotatable mount has an axis of rotation that is parallel to the first lateral axis. A torsion spring rotatably biases each latch away from engagement with the latch feature. The moveable plate engages a top surface of each latch to rotate the latch into engagement with the latch feature in response to a downward movement of the moveable plate.

In yet another implementation a latch includes an upper portion and a lower portion that are rotatably coupled at a hinge axis which is parallel to the first lateral axis. A spring is disposed between the upper and lower portions. Engagement of the upper portion with the movable plate compresses the spring which transfers the force to the lower portion. The lower portion engages a latch feature whereby a downward force of the latch upon the latch feature is determined by the spring compression. The spring can include two or more separate coil springs and/or a torsion spring.

In a further implementation the movable plate includes a proximal end adjacent to the proximal end of the support plate and extends to a distal end adjacent to the distal end of the support plate. The proximal end of the movable plate is rotatably mounted to the support plate with an axis of rotation that is parallel to the second lateral axis. The interface mechanism includes a main latch for securing the distal end of the movable plate to the distal end of the support plate. The main latch includes a hook and a catch. The hook extends downwardly from the distal end of the movable plate. The catch is slidably mounted to the distal end of the support plate. The main latch is engaged and disengaged through a linear motion of the catch along the first lateral axis.

In a yet further implementation the resin vessel has a central opening that is closed on a lower side by a transparent sheet. The central opening of movable plate aligns with the central opening of the resin vessel to allow access to the resin vessel by a support tray during operation of the three dimensional printing system.

DETAILED DESCRIPTION OF THE PREFERRED EMBODIMENTS

Figure 1:
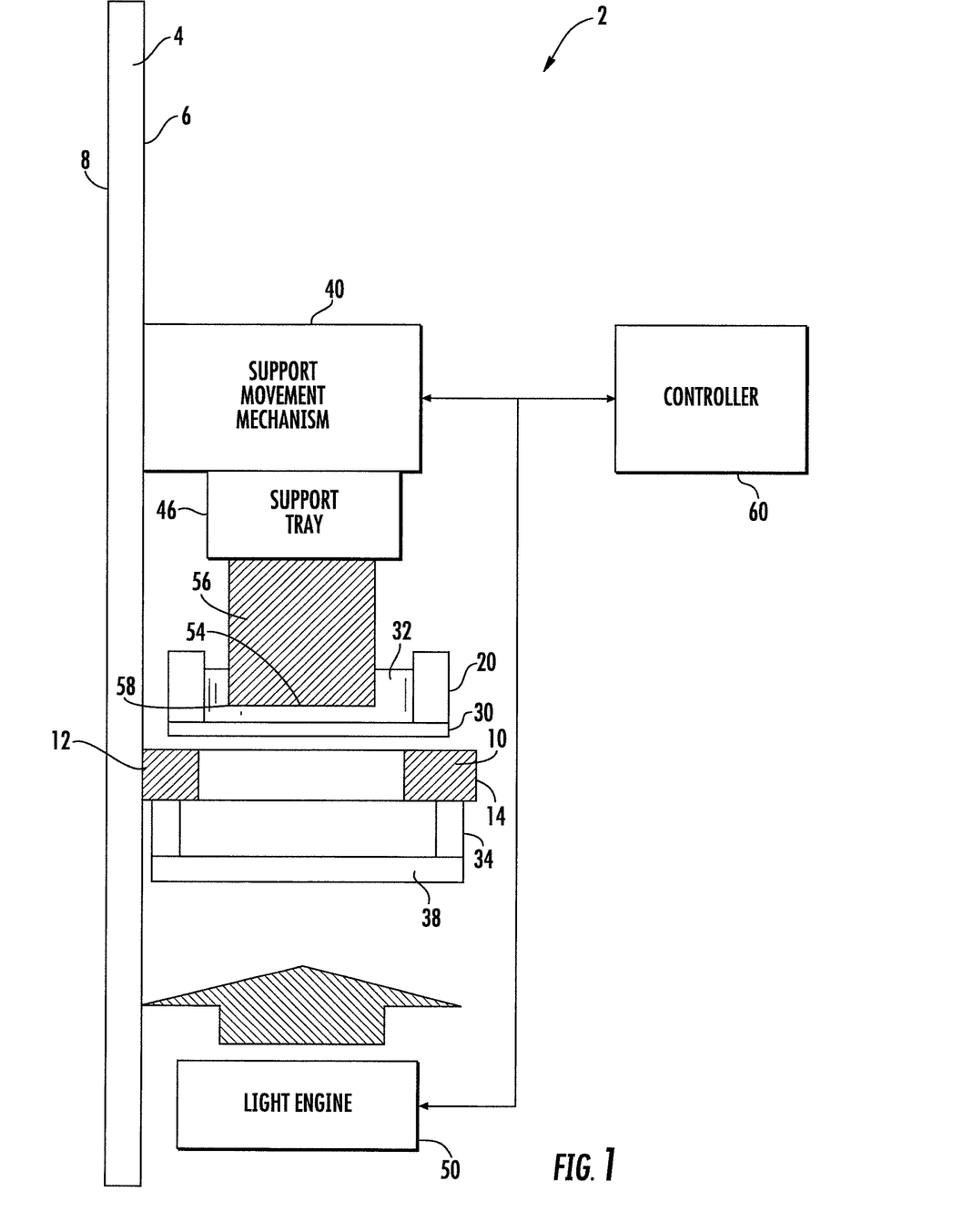
FIG. 1 is a schematic block diagram of a three dimensional (3D) printing system.
Figure 2:
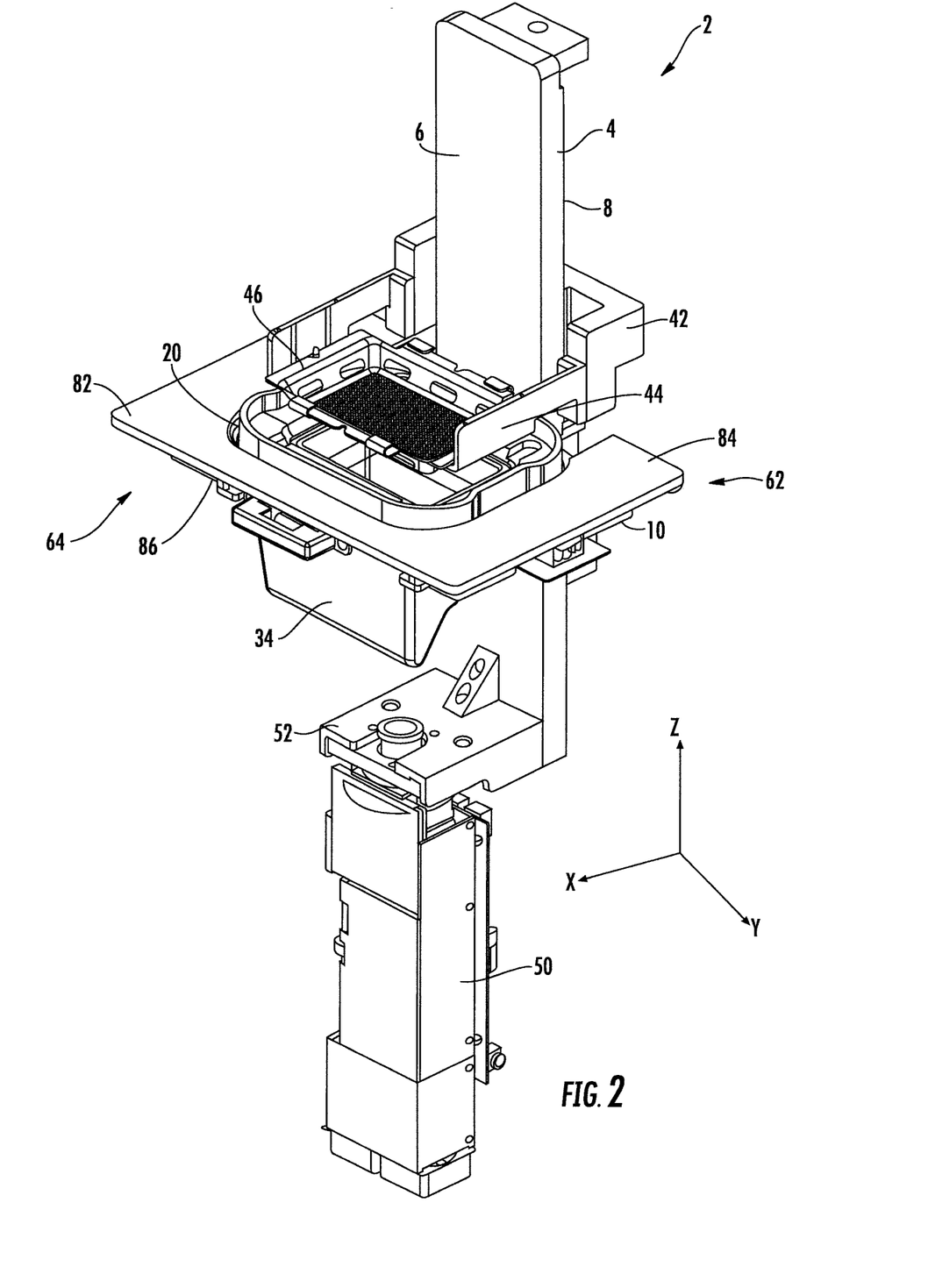
FIG. 2 is an isometric drawing of a three dimensional print engine.

FIG. 1 is a schematic block diagram and FIG. 2 is an isometric drawing of a three dimensional (3D) printing system 2. In describing the three dimensional printing system 2 mutually orthogonal axes X, Y, and Z are used. Axes X and Y are lateral axes that are generally or nearly horizontal with respect to a gravitational reference. Axes X and Y may be referred to as first and second lateral axes respectively. Vertical axis Z is generally or nearly aligned with the gravitational reference. Generally speaking, moving up or higher will refer to the +Z direction and moving down or lower will refer to the −Z direction. Left and right will generally refer to the −Y and +Y directions respectively. More proximal will refer to a −X direction and more distal will refer to a +X direction.

Three dimensional printing system 2 includes a main vertical support 4 having a front side 6 and a back side 8. Vertical support 4 generally provides a "vertical backbone" from which other components of three dimensional printing system 2 are mounted.

A support plate 10 is mounted to the vertical support 4. Support plate 10 has a proximal end 12 that is proximate to the front side 6 of vertical support 4. Support plate 10 extends from proximal end 12 to distal end 14 along the lateral axis X. Support plate 10 has an inner surface 16 (see FIG. 3) facing inwardly and defining a central opening 18.

Figure 3:
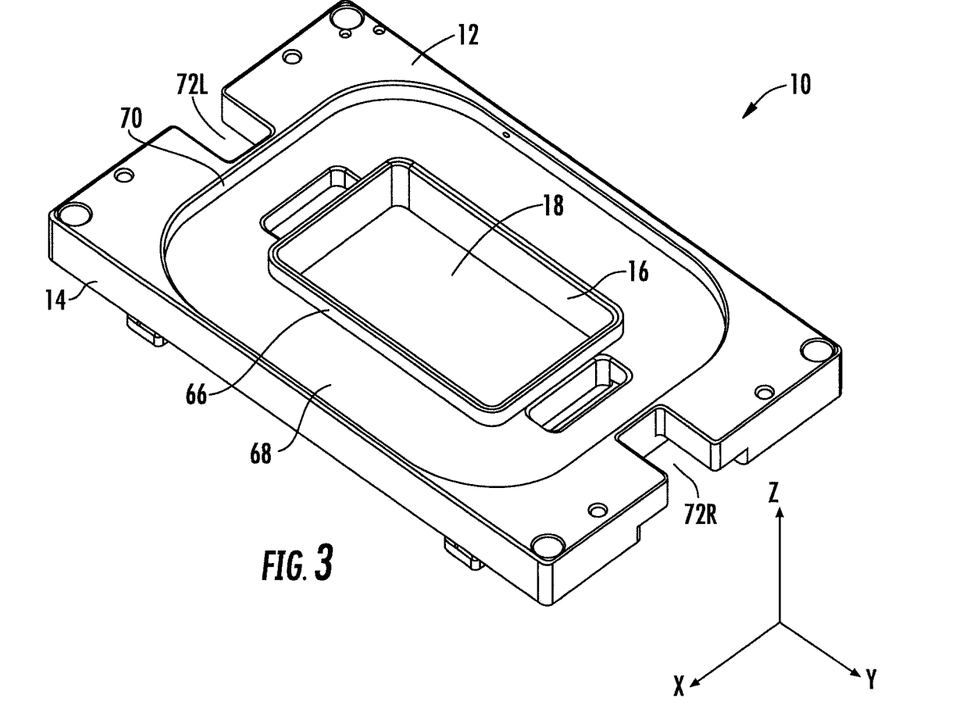
FIG. 3 is an isometric drawing of a support plate in isolation.
Figure 4:
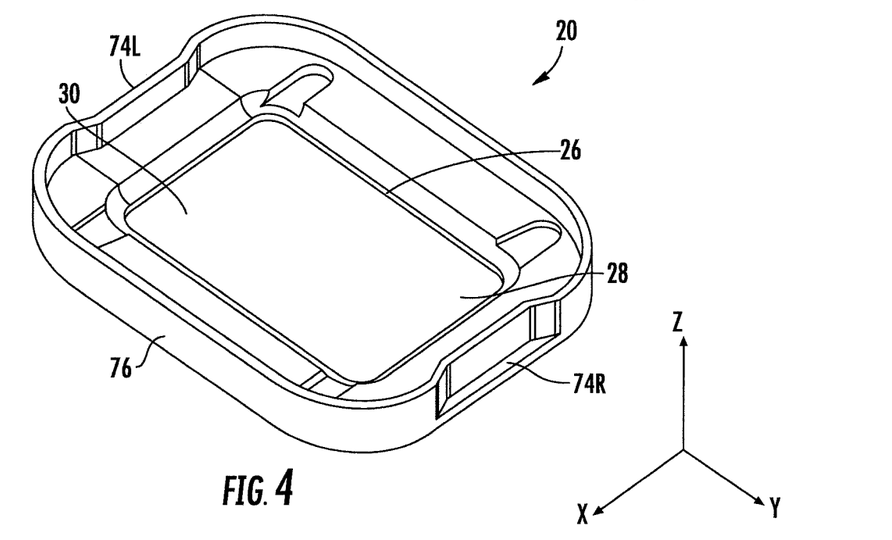
FIG. 4 is an isometric drawing of a resin vessel in isolation.
Figure 5:
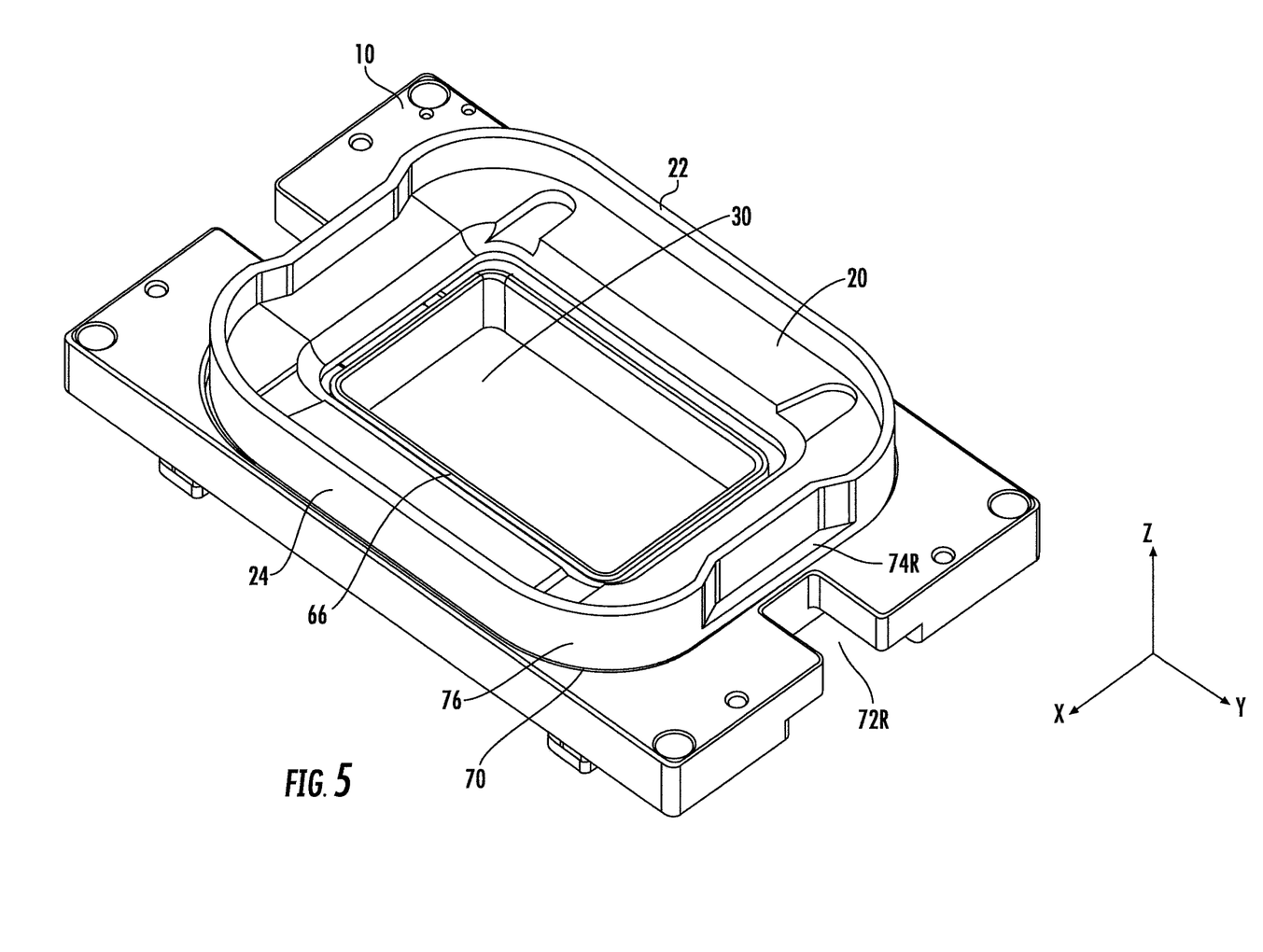
FIG. 5 is an isometric drawing of a resin vessel loaded onto a support plate.

(FIGS. 1 and 2) A resin vessel 20 is supported by the support plate 10 (see also FIGS. 3-5). The resin vessel 20 has a rear portion 22 that is proximate to the proximal end 12 of the support plate 10. The resin vessel 20 has a front portion 24 that is proximate to the distal end 14 of the support plate 10. Resin vessel 20 has an inner edge 26 that surrounds a central opening 28. The central openings 18 and 28 are laterally aligned with respect to each other to enable an optical path for vertically projected pixelated light. Central opening 28 is laterally contained within central opening 18. Closing the central opening 28 on a lower side of the resin vessel is a transparent sheet 30. Transparent sheet 30 provides a lower bound for resin 32 contained in the resin vessel 20.

(FIG. 2) A fluid spill containment vessel 34 is releasably mounted to a lower side of the support plate 10. Fluid spill containment vessel 34 is for capturing any resin spills resulting from damage to or overfilling of the resin vessel 20. The fluid spill containment vessel 34 includes a window 38. The window 38 is laterally aligned with the central openings 18 and 28 to enable the aforementioned optical path for vertically projected pixelated light.

(FIGS. 1 and 2) A support movement mechanism 40 includes a motorized carriage 42 that is configured to move up and down a vertical track on the vertical support 4. The carriage 42 includes receiving arms 44 for supporting a support tray 46.

(FIGS. 1 and 2) A light engine 50 is mounted to the vertical support 4 via a support bracket 52. Support bracket 52 extends away from the front side 6 of vertical support 4 along lateral axis X. Pixelated light from light engine 50 is projected vertically upwardly. The pixelated light passes through the fluid spill containment vessel 34, the support plate 10, and the resin vessel 20 to a build plane 54 within the resin vessel 20.

FIG. 1 depicts a three dimensional article of manufacture 56 being formed onto a lower surface of the support tray 46. Build plane 54 defines a lateral addressable extent of the light engine 50 within the resin vessel 20. The build plane 54 is actually a very thin slab or "slice" of resin with lateral dimensions in X and Y and a small vertical thickness. This slab of resin is selectively cured based upon a "slice" of data that is processed and sent to the light engine 50. The build plane 54 slab does not touch the transparent sheet 30 because an oxygen, chemical, or other inhibitor is utilized to block polymerization on an upper surface of transparent sheet 30. Each time a portion of the build plane 54 slab is selectively cured, it provides another accretive layer onto a lower face 58 of the three dimensional article of manufacture 56.

A controller 60 is controllably coupled to the support movement mechanism 40 and the light engine 50. Controller 60 includes a processor (not shown) coupled to an information storage device (not shown). The information storage device includes a non-transient or non-volatile storage device that stores software instructions that, when executed by the controller 60, operate the support movement mechanism 40, the light engine 50, and other portions of three dimensional printing system 2. The controller 60 can be located on one circuit board or distributed among multiple circuit boards throughout the three dimensional printing system 2.

The thickness of resin between the lower face 58 and the transparent sheet 30 is important because it provides an optical path for the pixelated light. The weight of the resin 32 and other factors can cause the transparent sheet 30 to bulge between a center and edges of the build plane 54. Such a bulge will result in variable curing and dimensional variations as a function of a distance from the center. To reduce this factor, a tensioning system 62 is provided to maintain flatness of the transparent sheet 30. Part of the tensioning system 62 is an interface mechanism 64 (FIG. 2) for controllably latching the resin vessel 20 above the support plate 10.

FIG. 3 is an isometric view of the support plate 10 in isolation. Surrounding the central opening 18 is a raised ridge 66 and a recessed area 68 bounded by a inwardly facing wall 70. The raised ridge 66 extends above the recessed area 68 and surrounds the central opening 18. The support plate 10 defines two pockets 72 that are adjacent to the recessed area 68 and at opposed ends of the support plate 10 with respect to the second lateral axis Y. The two pockets 72 include left pocket 72L and right pocket 72R because they are positioned on the left and right sides of the support plate 10 respectively and are positioned at roughly the midpoint with respect to the first lateral axis X.

FIG. 4 is an isometric view of the resin vessel 20 in isolation. Resin vessel 20 includes a pair of latch features 74 including a left latch feature 74L and a right latch feature 74R. The latch features 74 include upwardly facing surfaces 74 receiving a downwardly directed and controlled latch force. Controlling the latch force is important for the tensioning system 62. Resin vessel 20 also has an outer lateral boundary 76.

FIG. 5 depicts a resin vessel 20 disposed and aligned above a support plate 10. Lateral alignment of the resin vessel 20 to the support plate 10 in X and Y is provided by an engagement of the outer lateral boundary 76 within the inwardly facing wall 70. With the lateral alignment, the latch features 74 are positioned adjacent to the pockets 72.

A lower surface of the resin vessel 20 does not necessarily rest upon the recessed area 68. This is because the transparent sheet 30 engages the raised ridge 66 which tensions the transparent sheet 30. The force of engagement between the transparent sheet 30 and the raised ridge determines the tension in the transparent sheet 30.

Figure 6A:
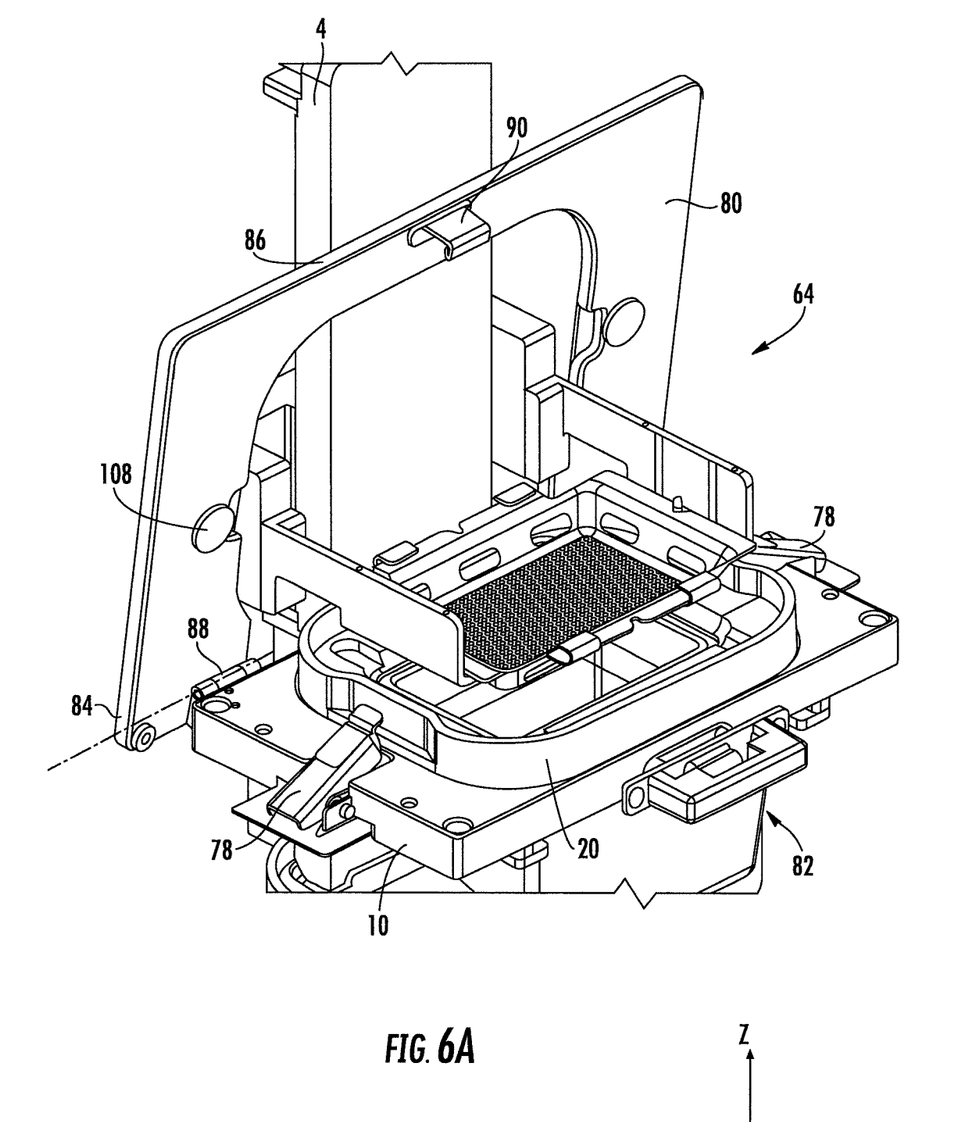
FIG. 6A is an isometric drawing of a portion of a three dimensional print engine to illustrate an interface mechanism in an unlatched configuration.
Figure 6B:
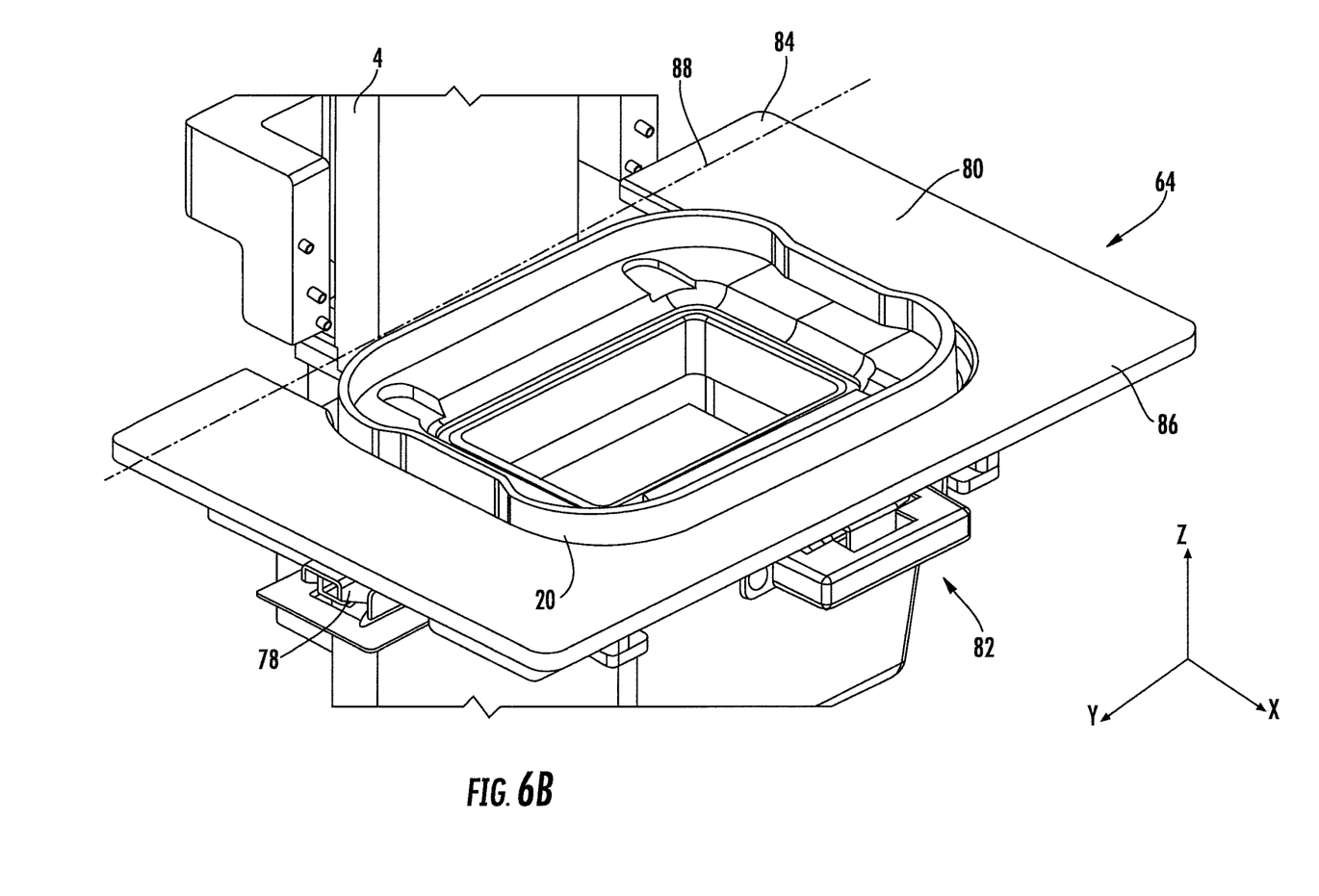
FIG. 6B is an isometric drawing of a portion of a three dimensional print engine to illustrate an interface mechanism in a latched configuration.

FIGS. 6A-B are isometric drawings for illustrating the interface mechanism 64 in unlatched (6A) and latched (6B) configurations. In the latched configuration, the interface mechanism 64 exerts a controlled downward net force on latch features 74. The net downward force is opposed by the upward force of the raised ridge 66 on the transparent sheet 30 which governs the tension in the transparent sheet 30.

The interface mechanism 64 includes a pair of lateral latches 78, a moveable plate 80, and a main latch 82. In the unlatched configuration (6A) the movable plate 80 is raised and the lateral latches 78 are disengaged from the latch features 74. When the movable plate 80 is lowered, it simultaneously engages the lateral latches 78 and presses them down to engage the latch features 74. In the latched configuration (6B), the movable plate 80 is secured in a lowered and horizontal configuration against the lateral latches 78 which in turn generate the downward force upon the latch features 74.

The movable plate 80 has proximal 84 and distal 86 ends. The proximal end 84 is rotatably attached to the support plate 10 via a hinge axis 88. The hinge axis 88 is defined by two hinges 88 and is parallel to the second lateral axis Y. Thus the distal end 86 rotates about the proximal end 84 via the hinge axis 88. The distal end 86 includes part of the main latch 82. The movable plate 80 is lowered by rotating it about the hinge axis 88. As it is rotated it engages the lateral latches 78 and is secured to the latched configuration via the main latch 82.

Figure 7:
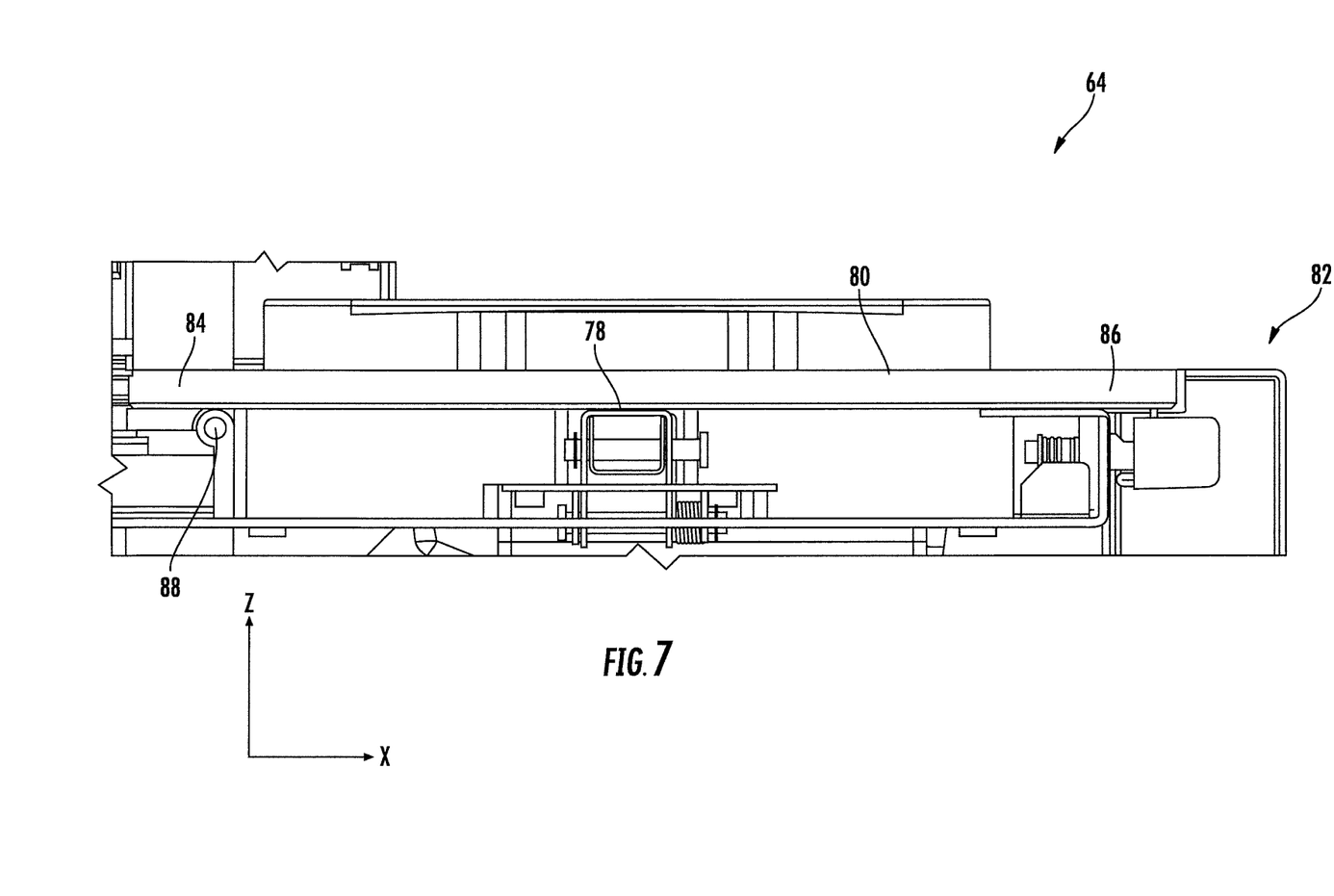
FIG. 7 is a side view of an interface mechanism in a latched configuration.

FIG. 7 is a side view of the interface mechanism 64 in the latched configuration. In this configuration a lower surface of the movable plate 80 is engaged with an upper surface of each lateral latch 78.

Figure 8:
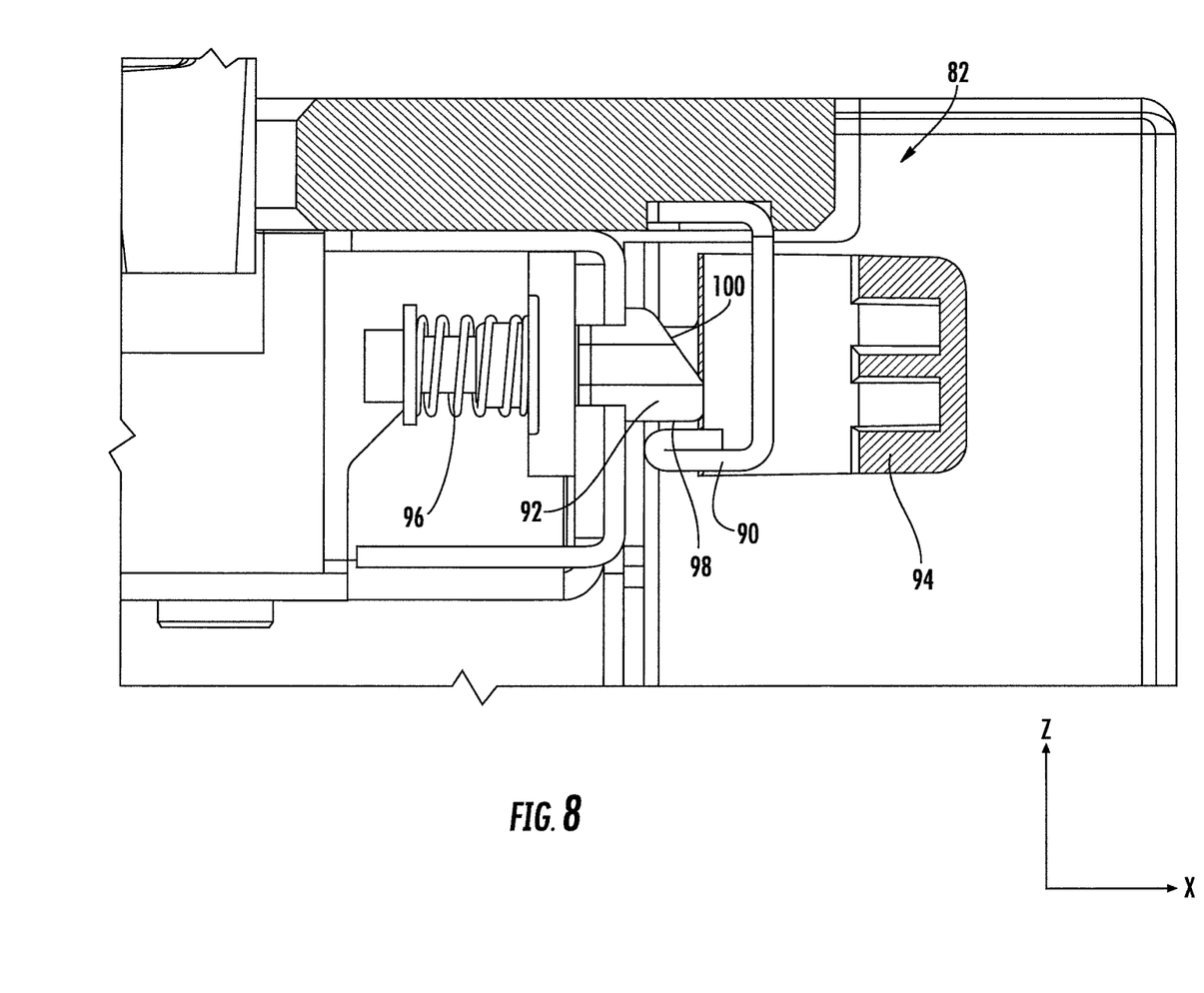
FIG. 8 is a side view illustrating a main latch.

FIG. 8 is a side view illustrating further details of the main latch 82 in the latched configuration. The main latch 82 includes portions coupled to the movable plate 80 and to the support plate 10. Main latch 82 includes a hook 90, a catch 92, a button 94, and a spring 96. The hook 90 extends downwardly and laterally (−X) from a lower side of the distal end 86 of the movable plate 80. The hook 90 is secured by a catch 92 that prevents its upward motion. The catch 92 is coupled to the button 94 so that the catch 92 and button 94 move laterally together along the first lateral axis X. In the latched configuration, the spring 96 urges the catch (and button) outwardly (+X) along the first lateral axis X which maintains an overlap between a lower surface 98 of the catch 92 and the hook 90.

When the button 94 is pressed inwardly (−X) the catch 92 also slides inwardly until the hook 90 no longer laterally overlaps the catch 92. Then the distal end 86 of the movable plate 80 is free to be rotated upwardly around the hinge axis 88 until it reaches a raised configuration to allow removal of the resin vessel 20 from the support plate 10.

To return the movable plate to the latched configuration, the distal end 86 is pressed downwardly. At some part of downward motion the hook 90 engages a sloped portion 100 of the catch 92. A downward force of the hook upon the sloped portion 100 causes the catch to slide inwardly (−X) against the spring 96 the lower surface 98 of the catch 92 clears the hook 90. Then the spring 96 displaces the catch 92 outwardly (+X) to place the main latch 82 into the latched configuration.

Figure 9A:
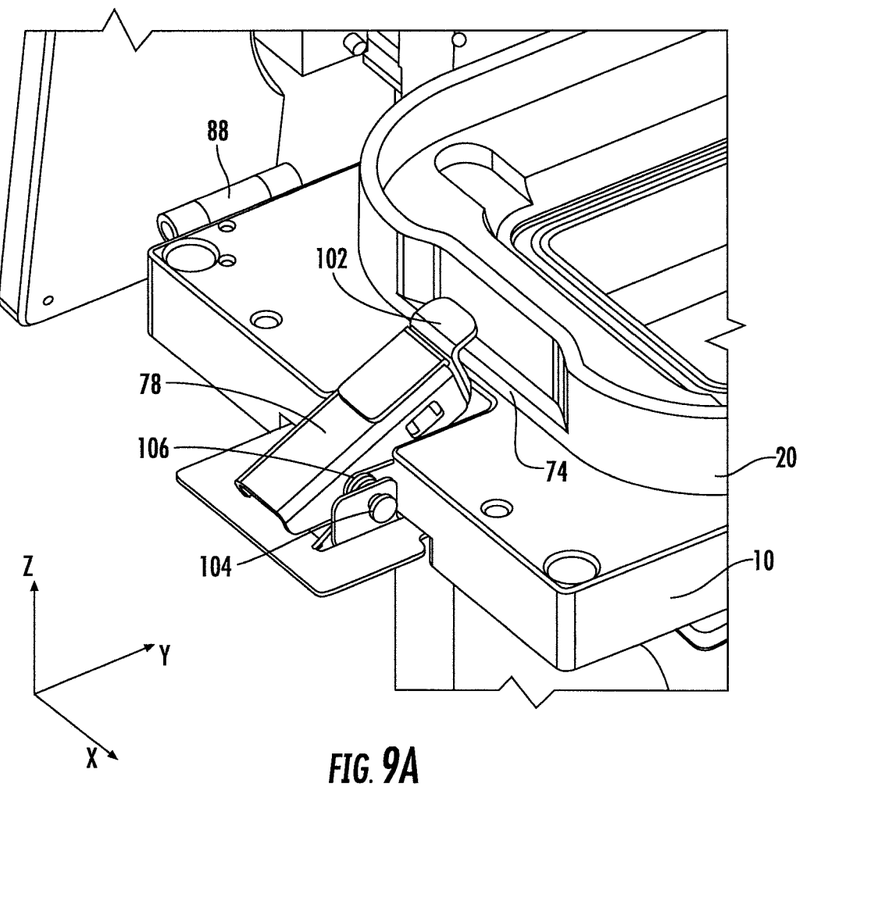
FIG. 9A is an isometric view illustrating a latch and resin vessel latch feature in an unlatched configuration.
Figure 9B:
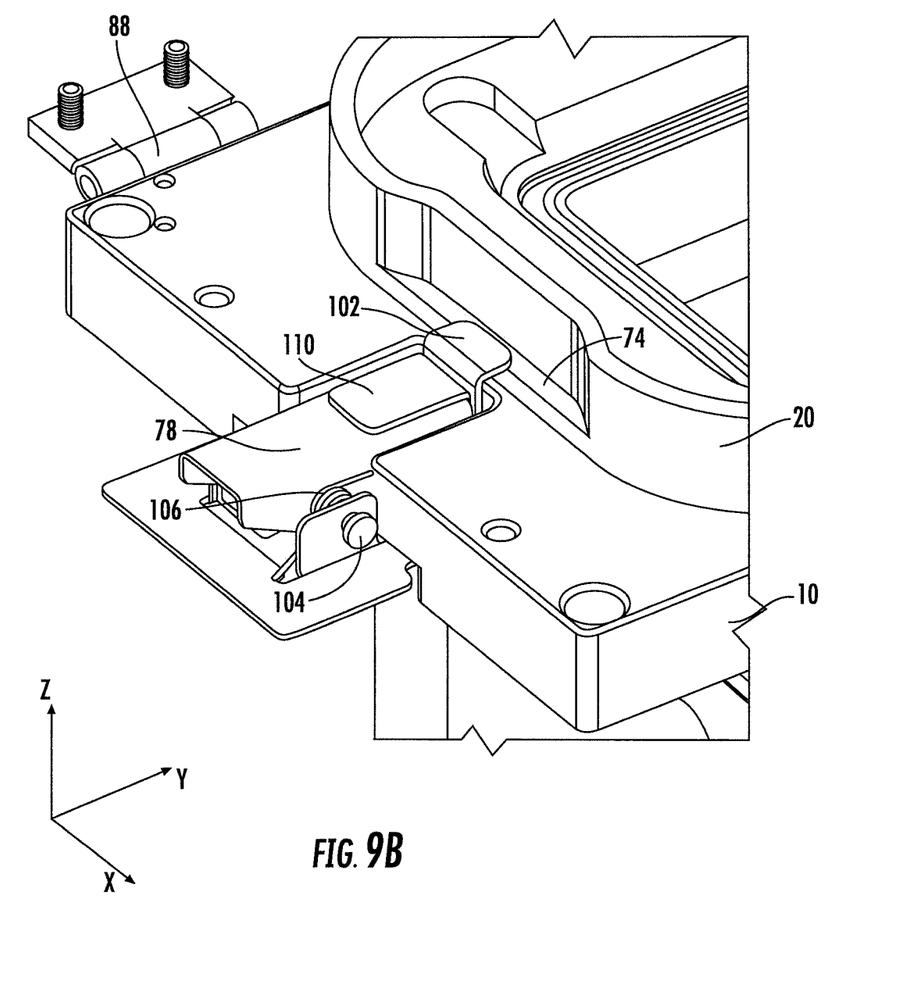
FIG. 9B is an isometric view illustrating a latch and resin vessel latch feature in a latched configuration.

FIGS. 9A-B are isometric drawings depicting a lateral latch 78 in the unlatched (9A) and latched (9B) configurations. Lateral latch 78 extends inwardly into pocket 72 (see also FIG. 3) of support plate 10. Lateral latch 78 has a hook 102 for engaging and applying downward pressure to the latch feature 74. Lateral latch 78 is rotatably mounted about a hinge axis 104 with respect to the support plate 10. Hinge axis 104 is parallel to the first lateral axis X. A torsion spring 106 biases the lateral latch 78 toward a raised, unengaged configuration of the hook 102 as in FIG. 9A.

In FIG. 9B, the lateral latch 78 is shown in the engaged or latched configuration. Not shown is an engagement of a portion 108 (FIG. 6A) of the moveable plate 80 that presses down onto an upper portion 110 of the lateral latch 78 to overcome the torsion spring 106 and maintain the latched configuration.

Figure 10A:
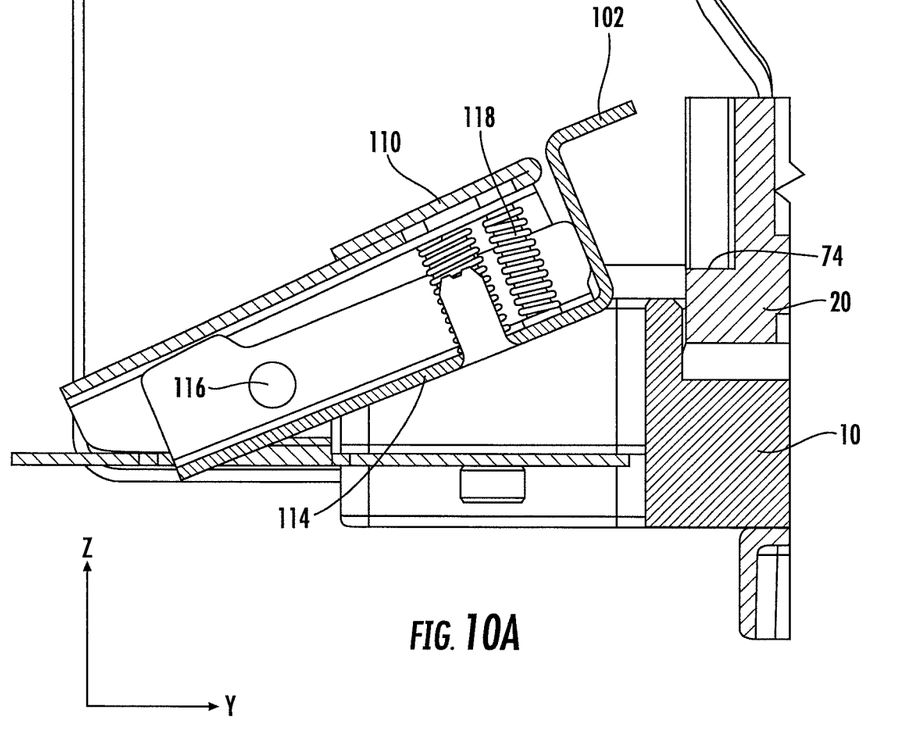
FIG. 10A is a side sectional view illustrating a latch and resin vessel latch feature in an unlatched configuration.
Figure 10B:
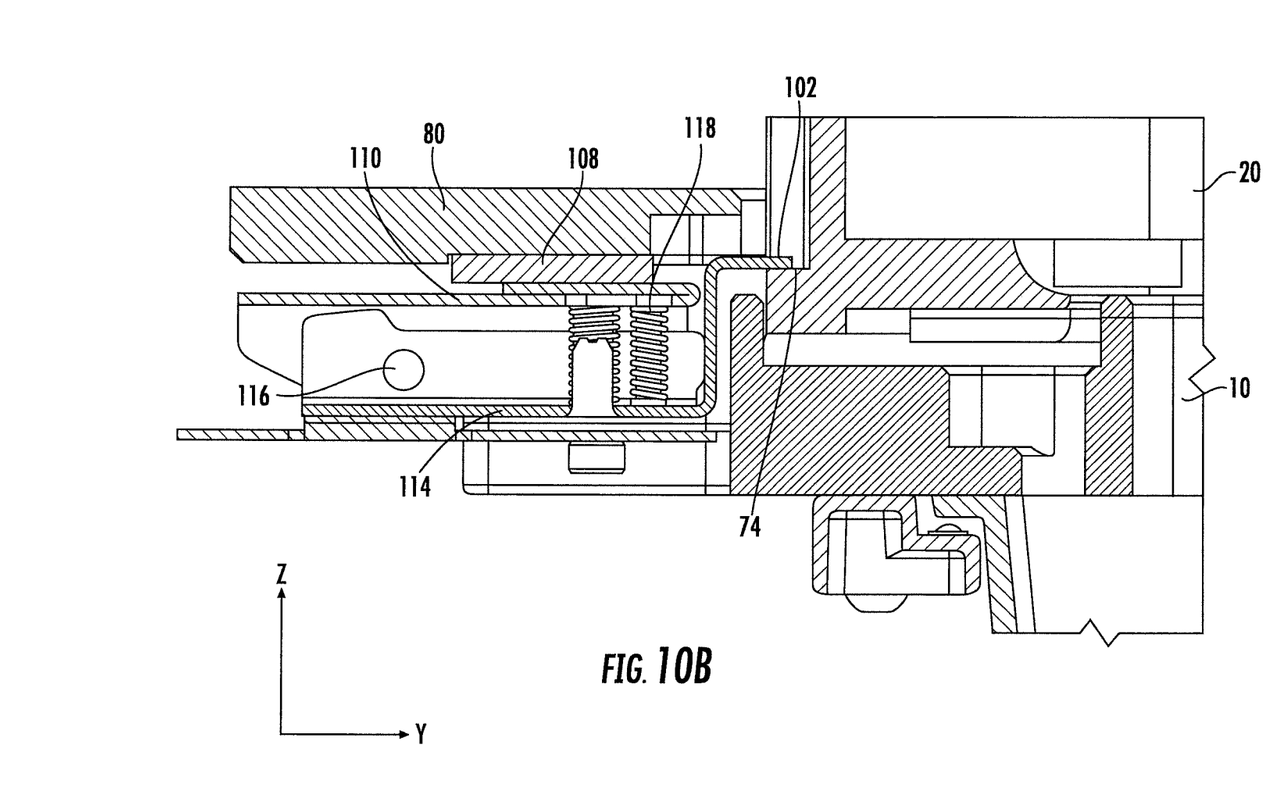
FIG. 10B is a side sectional view illustrating a latch and resin vessel latch feature in a latched configuration.

FIGS. 10A-B are side view depicting a lateral latch 78 in the unlatched (10A) and latched (10B) configurations. Lateral latch 78 has two portions including an upper portion 110 and a lower portion 114 that are pivotally mounted with respect to each other about rotational axis 116. Hook 102 is attached to the lower portion 114. Axis 116 is parallel to the first lateral axis X and it may coincide with hinge axis 104. Between axis 116 and hook 102 is/are one or more spring(s) 118. In the unlatched state, spring(s) 118 rotationally urge the upper 110 and lower portions 114 apart near hook 102.

In the latched state, portion 108 of the movable plate 80 engages the upper portion 110 of the lateral latch 78. The spring(s) 118 is/are compressed and apply a downward force on the lower portion 114. The compression of spring(s) 118 determine a downward force of hook 102 on the latch feature 74. Thus, the tensioning of the transparent sheet 30 is controlled by a controlled compression of the spring(s) 118.

The specific embodiments and applications thereof described above are for illustrative purposes only and do not preclude modifications and variations encompassed by the scope of the following claims.

What I claim is:

1. A three dimensional printing system comprising:
a vertical support extending along a vertical axis (Z);
a support plate extending from the vertical support along a first lateral axis (X) from a proximal end at the vertical support to a distal end that is spaced from the vertical support along the first lateral axis (X);
a resin vessel disposed above the support plate and having a pair of latch features disposed at opposing ends of the resin vessel relative to a second lateral axis (Y);
the first lateral axis (X), the second lateral axis (Y), and the vertical axis (Z) are all mutually orthogonal with respect to each other;
a pair of latches disposed adjacently to the opposing ends of the resin vessel; and
a movable plate that includes a central opening to provide access to the resin vessel and is configured to engage the pair of latches with a single movement of the movable plate whereby the latches in response engage the latch features of the resin vessel.

2. The three dimensional printing system of claim 1 wherein the latch features include upward facing surfaces, the pair of latches include hooks for exerting downward forces upon the latch features.

3. The three dimensional printing system of claim 1 wherein each latch is rotatably mounted to the support plate and extends to a hook at which the latch engages the latch feature.

4. The three dimensional printing system of claim 3 wherein a first spring rotatably biases each latch away from engagement with the latch feature, the moveable plate engages a top surface of each latch to rotate the latch into engagement with the latch feature in response to a downward movement of the moveable plate.

5. The three dimensional printing system of claim 1 wherein each latch has a first portion and a second that are pivotally mounted with respect to each other about a hinge.

6. The three dimensional printing system of claim 5 wherein a second spring engages the first and second portions, engagement of the upper portion with the movable plate compresses the second spring which transmits a force to the lower portion which engages one of the latch features with a force that is determined by a spring compression.

7. The three dimensional printing system of claim 1 wherein the movable plate includes a proximal end adjacent to the proximal end of the support plate and extends along the first lateral axis to a distal end, the movable plate is rotatably mounted to the support plate at the proximal end by a hinge axis that is parallel to the second lateral axis.

8. The three dimensional printing system of claim 7 further comprising a main latch that secures the distal end of the movable plate to the distal end of the support plate.

9. The three dimensional printing system of claim 8 wherein the main latch includes a hook extending downward from the distal end of the movable plate and a catch that is slidably mounted to the distal end of the support plate.

10. The three dimensional printing system of claim 1 wherein the resin vessel has a central opening that is closed on a lower side with a sheet, the central opening of the resin vessel aligns with the central opening of the movable plate to allow access to the resin vessel by a support tray during operation of the three dimensional printing system.

11. A three dimensional printing system comprising:
   a vertical support extending along a vertical axis;
   a support plate extending from the vertical support along a first lateral axis from a proximal end to a distal end;
   a resin vessel disposed above the support plate and having a pair of latch features disposed at opposing ends of the resin vessel relative to a second lateral axis, the vertical axis, the first lateral axis, and the second lateral axis are mutually orthogonal;
   a pair of latches disposed adjacently to the opposing ends of the resin vessel, each latch feature rotatably mounted to the support plate with a hinge having a hinge axis that is parallel to the first lateral axis; and
   a movable lever plate mounted above the support plate with plate hinge axis that is parallel to the second lateral axis, a downward movement rotation of the movable plate causes a lower surface of the movable lever plate to engage an upper surface of each latch feature whereby the latch features rotate to engage the latch features.

12. The three dimensional printing system of claim 11 wherein the latch features include upward facing surfaces, the pair of latches include hooks for exerting downward forces upon the latch features.

13. The three dimensional printing system of claim 11 wherein a first spring rotatably biases each latch away from engagement with the latch feature.

14. The three dimensional printing system of claim 11 wherein each latch has a first upper portion and a second portion that are pivotally mounted with respect to each other about a hinge.

15. The three dimensional printing system of claim 14 wherein a second spring engages the first and second portions, engagement of the upper portion with the moveable plate compresses the second spring which transmits to the lower portion which engages one of the latch features with a force that is determined by a spring compression.

16. The three dimensional printing system of claim 11 wherein the movable plate includes proximal and distal ends corresponding to the proximal and distal ends of the support plate respectively, the plate hinge axis is at the proximal end of the movable plate, and further comprising a main latch that couples the distal end of the movable plate to the distal end of the support plate.

17. The three dimensional printing system of claim 16 wherein the main latch is engaged and disengaged by movement along the first lateral axis.

\* \* \* \* \*